US012122255B2

(12) United States Patent
Weigel et al.

(10) Patent No.: US 12,122,255 B2
(45) Date of Patent: *Oct. 22, 2024

(54) CONTACT APPARATUS AND CHARGING CONTACT UNIT AND METHOD FOR ELECTRICALLY CONNECTING A VEHICLE TO A CHARGING STATION

(71) Applicant: SCHUNK TRANSIT SYSTEMS GMBH, Wettenberg (DE)

(72) Inventors: Wilfried Weigel, Dautphetal (DE); Lothar Schneider, Lahnau (DE); Matthias Domes, Bad Nauheim (DE); Viktor Thielmann, Pohlheim (DE); Timo Staubach, Herbstein (DE); Sven Klausner, Dresden (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 788 days.

This patent is subject to a terminal disclaimer.

(21) Appl. No.: 17/138,289

(22) Filed: Dec. 30, 2020

(65) Prior Publication Data

US 2021/0114474 A1    Apr. 22, 2021

Related U.S. Application Data

(63) Continuation of application No. 14/908,674, filed as application No. PCT/EP2014/066983 on Aug. 7, 2014, now Pat. No. 10,906,416.

(30) Foreign Application Priority Data

Aug. 9, 2013 (DE) ...................... 10 2013 013 201.0

(51) Int. Cl.
*B60L 53/16* (2019.01)
*B60L 53/10* (2019.01)
(Continued)

(52) U.S. Cl.
CPC ............... *B60L 53/30* (2019.02); *B60L 53/11* (2019.02); *B60L 53/16* (2019.02); *B60L 53/36* (2019.02);
(Continued)

(58) Field of Classification Search
CPC .............................. B60L 53/30; H01R 13/629
(Continued)

(56) References Cited

U.S. PATENT DOCUMENTS 3,729,599 A    4/1973  Payen
3,786,762 A    1/1974  Corkum et al.
(Continued)

FOREIGN PATENT DOCUMENTS

CN    2435270 Y    6/2001
CN    1486889 A    4/2004
(Continued)

OTHER PUBLICATIONS

PCT International Search Report, PCT/EP2014/066983, Nov. 20, 2014, 2 pages.
(Continued)

*Primary Examiner* — Nghia M Doan
(74) *Attorney, Agent, or Firm* — Quarles & Brady LLP

(57) ABSTRACT

The invention relates to a contact apparatus and to a charging contact unit for a rapid-charging system for electrically driven vehicles, in particular electric buses or the like, and to a method for forming an electrically conductive connection between a vehicle and a stationary charging station, wherein the contact apparatus serves to form an electrically conductive connection between the vehicle and the stationary charging station comprising a charging contact unit, wherein the contact apparatus can be arranged on a vehicle, wherein the contact apparatus comprises a contact device, wherein the contact device can make contact with the (Continued)

charging contact unit, wherein the contact apparatus or the charging contact unit comprises a positioning device, wherein the contact device can be positioned relative to the charging contact unit by means of the positioning device, wherein the positioning device has a pantograph or a swing arm, by means of which the contact device can be positioned in the vertical direction relative to the charging contact unit, wherein the contact device has a contact element support comprising contact elements, wherein the contact elements can make contact with the charging contact elements of the charging contact unit so as to form contact pairs, wherein the positioning device has a transverse guide, by means of which the contact element support can be positioned transversely relative to the charging contact unit, wherein the transverse guide is arranged at a distal end of the pantograph or of the swing arm.

14 Claims, 13 Drawing Sheets

(51) Int. Cl.
  *B60L 53/30* (2019.01)
  *B60L 53/36* (2019.01)
  *H01R 13/629* (2006.01)
  *H01R 13/631* (2006.01)
(52) U.S. Cl.
  CPC ....... *H01R 13/629* (2013.01); *H01R 13/6315* (2013.01); *B60L 2200/18* (2013.01); *Y02T 10/70* (2013.01); *Y02T 10/7072* (2013.01); *Y02T 90/12* (2013.01); *Y02T 90/14* (2013.01)
(58) Field of Classification Search
  USPC ......................................................... 320/109
  See application file for complete search history.

(56) References Cited

U.S. PATENT DOCUMENTS

| | | | |
|---|---|---|---|
| 6,803,533 B2 | 10/2004 | Bonn et al. | |
| 6,817,879 B2 | 11/2004 | Mulvenna et al. | |
| 7,986,125 B2 | 7/2011 | Mitake et al. | |
| 8,307,967 B2 | 11/2012 | Patwardhan | |
| 8,324,858 B2 | 12/2012 | Hill et al. | |
| 8,747,136 B2 | 6/2014 | Maurer et al. | |
| 8,829,853 B2 * | 9/2014 | Hill | B60L 53/11 191/23 A |
| 10,906,416 B2 * | 2/2021 | Weigel | H01R 13/6315 |
| 2002/0081486 A1 | 6/2002 | Williams | |
| 2003/0162448 A1 | 8/2003 | Routtenberg et al. | |
| 2010/0235006 A1 | 9/2010 | Brown | |
| 2010/0328057 A1 | 12/2010 | Liu | |
| 2012/0280656 A1 | 11/2012 | Bedell | |
| 2013/0256073 A1 | 10/2013 | Yamada et al. | |
| 2014/0070767 A1 * | 3/2014 | Morris | B60L 53/32 320/109 |
| 2016/0167532 A1 * | 6/2016 | Weigel | H01R 13/6315 320/109 |
| 2016/0185239 A1 * | 6/2016 | Weigel | H01R 13/6315 320/109 |
| 2016/0272074 A1 * | 9/2016 | McGrath | B60L 58/40 |
| 2016/0280087 A1 | 9/2016 | Tajima et al. | |

FOREIGN PATENT DOCUMENTS

| | | |
|---|---|---|
| CN | 201124766 Y | 10/2008 |
| CN | 101531141 A | 9/2009 |
| CN | 102484341 A | 5/2012 |
| CN | 102781715 A | 11/2012 |
| CN | 102834281 A | 12/2012 |
| CN | 102917907 A | 2/2013 |
| CN | 103098313 A | 5/2013 |
| CN | 103181034 A | 6/2013 |
| DE | 4344563 C1 | 12/1994 |
| DE | 102007029197 A1 | 1/2009 |
| DE | 202010015377 U1 | 11/2011 |
| JP | S48100708 U | 11/1973 |
| JP | S48102708 U | 12/1973 |
| JP | S5021413 A | 3/1975 |
| JP | S50117110 A | 9/1975 |
| JP | S5488509 A | 7/1979 |
| JP | H0614409 A | 1/1994 |
| JP | H107147703 A | 6/1995 |
| JP | 2006081310 A | 3/2006 |
| JP | 2014204315 A | 10/2014 |
| WO | 2010076976 A2 | 7/2010 |
| WO | 2011079215 A2 | 6/2011 |

OTHER PUBLICATIONS

The Patent Office of the People's Republic of China, First Office Action and Search Report, Application No. 201480045184.1, Jul. 4, 2017.

Japan Patent Office, Notification of Reason(s) for Refusal, Application No. P2016-532687, May 11, 2018, 6 pages [English Language Translation Only].

European Patent Office, Search Report, Application No. EP 17205973.5, Mar. 23, 2018, 4 pages.

\* cited by examiner

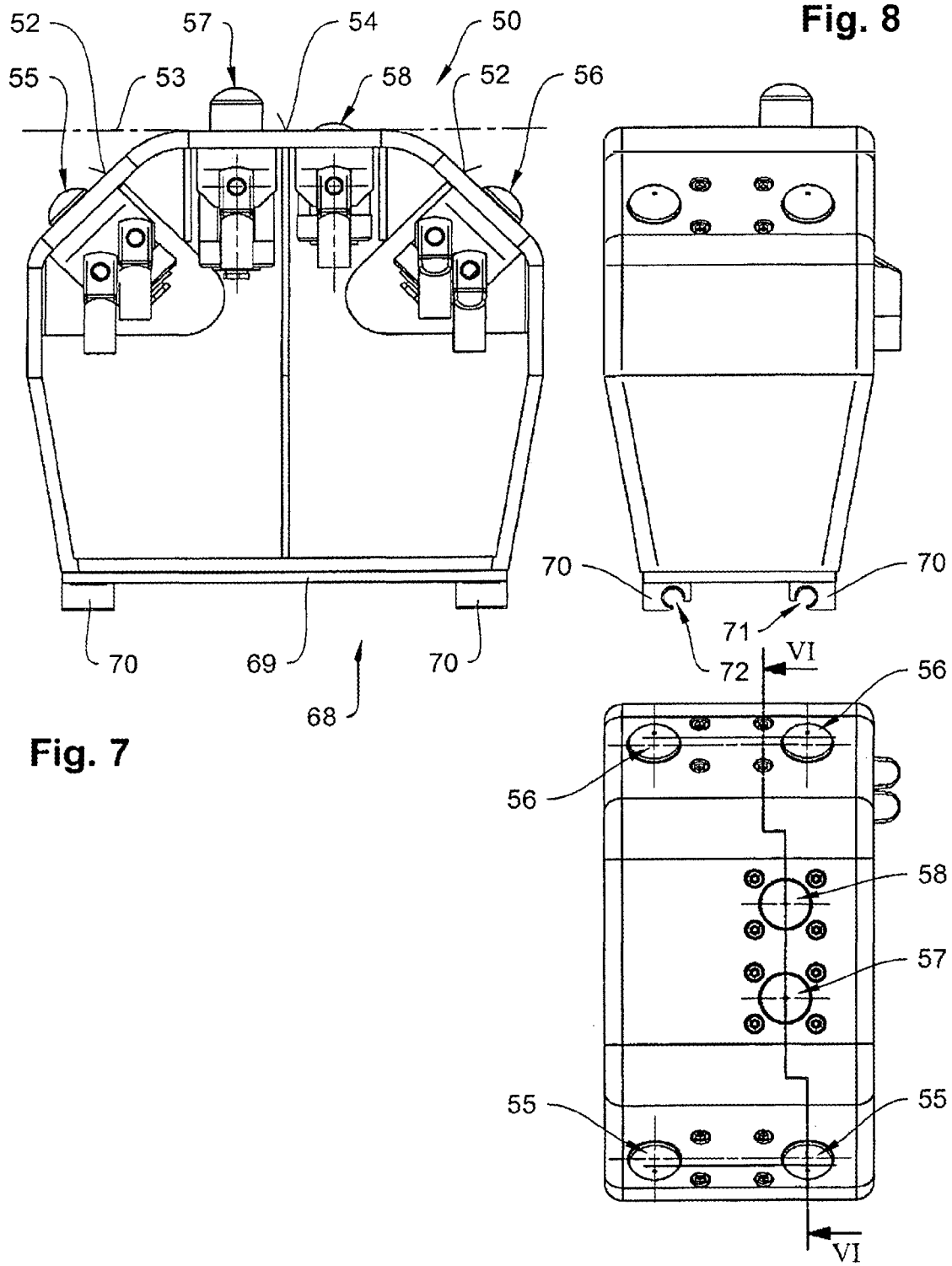

Fig. 19
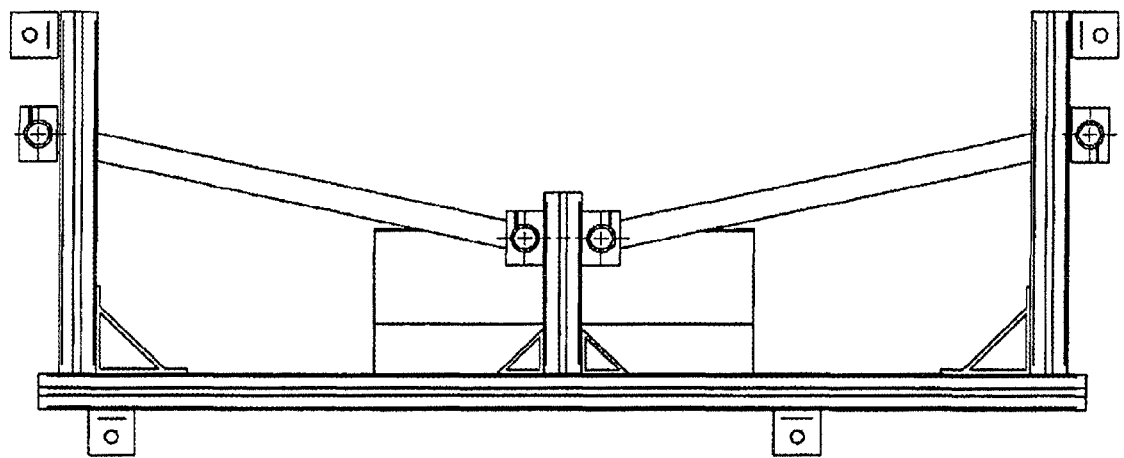
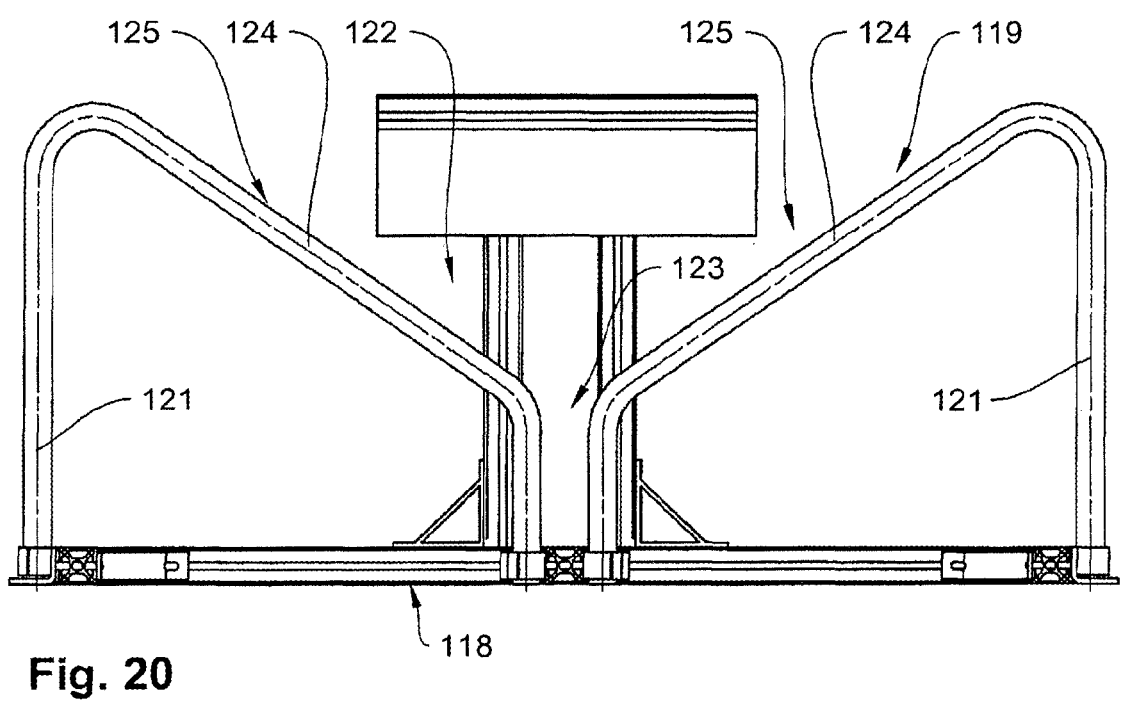
Fig. 20

CONTACT APPARATUS AND CHARGING CONTACT UNIT AND METHOD FOR ELECTRICALLY CONNECTING A VEHICLE TO A CHARGING STATION

CROSS-REFERENCE TO RELATED APPLICATIONS

This application is a continuation of U.S. patent application Ser. No. 14/908,674 filed on Jan. 29, 2016, which is the national stage application of international application PCT/EP2014/066983, filed on Aug. 8, 2014, which claims priority to German Patent Application DE 10 2013 013 201.0 filed on Aug. 9, 2013, which applications are hereby incorporated by reference in their entirety.

The invention relates to a contact apparatus and to a charging contact unit that can be connected to the contact apparatus, and to a method for forming an electrically conductive connection between a vehicle and a stationary charging station, in particular for a rapid-charging system for electrically driven vehicles, such as electric buses or the like, comprising the contact apparatus and the charging contact unit, wherein the contact apparatus can be arranged on a vehicle, wherein the contact apparatus comprises a contact device, wherein the contact device can make contact with the charging contact unit, wherein the contact apparatus or the charging contact unit comprises a positioning device, wherein the contact device can be positioned relative to the charging contact unit by means of the positioning device, wherein the positioning device has a pantograph or a swing arm, by means of which the contact device can be positioned in the vertical direction relative to the charging contact unit, wherein the contact device has a contact element support comprising contact elements, wherein the contact elements can make contact with charging contact elements of the charging contact unit so as to form contact pairs.

Contact apparatuses, charging contact units and methods of this kind are known from the state of the art and are commonly employed for rapid charging of electrically driven vehicles at a stop or stopping place. Electrically driven vehicles used in local transport, such as buses, can be continuously supplied with electrical energy via an overhead wire, for example. However, that requires an overhead-wire system to be present and maintained. To be able to use the advantages of an electric drive without a network of overhead wires, it is known to equip means of public transport with batteries or with another kind of energy storage. These present the disadvantages of a limited range of the vehicle and of the batteries needing to be recharged after a comparatively short time of travel. However, continuous operation of the vehicle can be ensured if the batteries can be rapidly charged during a stop of the vehicle at stopping place.

In this context, different systems for forming an electrically conductive connection between a charging station, which is stationarily arranged in the area of a stopping place, and a vehicle or electric bus are known from the state of the art. For instance, a so-called current collector comprising a contact strip may be arranged on a roof of the electric bus, a rail running lengthwise in the direction of travel of the electric bus being suspended above a driving lane in the area of the stopping place. When the electric bus stops at the stopping place, the current collector is moved from the roof of the bus upward against the rail, and an electric connection is thus formed for the duration of the planned stop of the electric bus at the stopping place so that rapid charging can take place during this period. However, in particular two mutually independent current collectors and corresponding contacting areas at the rail are required in order to be able to form a charging circuit.

Furthermore, it is known to arrange multiple contact elements on a current collector that are realized as a contact strip and to bring them into contact with a corresponding number of parallel rails arranged in the direction of travel of the electric bus. In this way, it is possible to produce a greater number of contact pairs simultaneously with a single current collector or a single contact apparatus. Electrical connecting lines additionally formed in this way between the charging station and the vehicle can be used to control and monitor a charging process, for example.

In another known rapid-charging system, a contact apparatus is arranged on a roof of an electric bus in such a manner that an arm that can be connected to a charging contact unit that is integrated in a superstructure of the stopping place or in a building can be extended perpendicularly to the direction of travel of the electric bus. In this context, it is particularly disadvantageous that the electric bus has to be positioned by a driver in a particularly exact manner in a predefined position at such a stopping place in order to be able to form a connection at all between the electric bus and the charging station.

Alternatively, a rapid-charging system can also be designed in such a manner that a charging contact unit at the charging station is lowered toward a roof of an electric bus. In that case, the charging contact unit is first brought into contact with the roof of the electric bus, wherein the electric bus is subsequently positioned relative to the charging contact unit in the direction of travel in such a manner that the charging contact unit is guided to a rail arranged on the roof. The rail is provided with corresponding contacts for forming an electrical connection. In this context, it is particularly disadvantageous that all stops of a bus line have to be equipped with a technically comparatively complex positionable charging contact unit. In comparison, the use of a stationary charging contact unit that does not have a special mechanical movement mechanism is substantially more cost-effective.

However, a number of problems can also occur in stationary charging contact units or rails that are arranged above or laterally of an electric bus stopping at a stopping place. In particular as a function of a payload of the electric bus, the electric bus may be positioned deeper or higher relative to the charging contact unit during a stop. When the electric bus is lowered on the entry side to assist the passengers in entering the bus, then too, the contact apparatus or the used contact strips shift relative to a charging contact unit or rail, an electrical contact possibly being interrupted. If parallel rails are used, it is necessary in that case as well, by the way, to position the electric bus in a relatively exact manner in a designated area at the stopping place. A position diverging from the designated position of the electric bus and a one-sided lateral lowering of the electric bus may prevent a successful contact or connection between the vehicle and the charging station and present a significant risk potential. For instance, conductors may be unintentionally contacted or connected and short circuits may occur, which may damage components of the rapid-charging system or harm people in the vicinity.

Thus, the object of the present invention is to provide a contact apparatus and a charging contact unit and a method for forming an electrically conductive connection between a vehicle and a charging station that allow safely forming a contact while keeping the operation of the means of transport cost-effective.

This object is attained by a contact apparatus having the features of claim 1, by a charging contact unit having the features of claim 8, by a rapid-charging system having the features of claim 15 and by a method having the features of claim 16.

The contact apparatus according to the invention for a rapid-charging system for electrically driven vehicles, in particular electric buses or the like, serves to form an electrically conductive connection between a vehicle and a stationary charging station comprising a charging contact unit, wherein the contact apparatus can be arranged on a vehicle, wherein the contact apparatus comprises a contact device, wherein the contact device can make contact with the charging contact unit, wherein the contact apparatus or the charging contact unit comprises a positioning device, wherein the contact device can be positioned relative to the charging contact unit by means of the positioning device, wherein the positioning device has a pantograph or a swing arm, by means of which the contact device can be positioned in the vertical direction relative to the charging contact unit, wherein the contact device has a contact element support comprising contact elements, wherein the contact elements can make contact with charging contact elements of the charging contact unit so as to form contact pairs, wherein the positioning device has a transverse guide, by means of which the contact element support can be positioned transversely relative to the charging contact unit, wherein the transverse guide is arranged at a distal end of the pantograph or of the swing arm.

Thus, when an electric bus, for example, stops at a stopping place, the contact device can be moved by means of the positioning device and can be moved toward the charging contact unit preferably in a vertical direction and can be joined with said charging contact unit. In principle, it is also possible that the charging contact unit comprises the positioning device and is moved toward the contact device by means of the positioning device. A charging contact formed in this manner between the charging station and the vehicle comprises at least two contact pairs, each consisting of a contact element and an associated charging contact element of the charging contact unit.

According to the invention, the positioning device has a pantograph or a swing arm, by means of which the contact device can be positioned relative to the charging contact unit or to the vehicle in the vertical direction. In case of a swing arm, an additional linkage may be provided, which stabilizes the contact device relative to the charging contact unit and aligns it in the appropriate direction. A pantograph or a swing arm or a corresponding mechanical drive can be produced in a particularly simple and cost-effective way.

The positioning device has a transverse guide, by means of which the contact element support can be positioned transversely relative to the charging contact unit or to the direction of travel of the vehicle. The transverse guide is arranged on the pantograph or on the swing arm of the positioning device. In both cases, the contact element support arranged on the transverse guide or the charging contact unit can thus be displaced transversely to the direction of travel of the vehicle. For example, this displaceability allows an incorrect positioning of the vehicle at a stopping place to be compensated transversely to the direction of travel. Moreover, potential movements of the vehicle due to a one-sided lowering of the vehicle for entry and exit of passengers can be compensated in such a manner that the contact element support does not shift relative to the charging contact unit in the transverse direction.

According to the invention, the transverse guide is arranged at a distal end of the pantograph or of the swing arm. Thus, it is no longer necessary for the swing arm or the pantograph to be moved transversely to the direction of travel; instead, it is sufficient to move only the contact element support or the charging contact unit on the transverse guide. Thus, a mass to be moved is reduced. Also, a smaller torque and no longer any substantial perpendicular forces act on a pantograph or a swing arm. Preferably, the transverse guide can be permanently mounted directly to the distal upper end of the pantograph or of the swing arm so that the contact element support can be easily moved on the transverse guide.

The transverse guide can be realized as a straight linear guide or as a curved linear guide. The curved linear guide can then have a radius of a curve that corresponds to a height of the transverse guide above a roadway.

In one embodiment, the contact device can be arranged on a roof of a vehicle, which may be the roof of an electric bus or of a tramway car, for example. It may also be envisaged, for example, to position the contact device on the roof of the vehicle in such a manner that it is arranged on a driver side of the roof of the vehicle in the direction of travel. In this way, it is substantially easier for a driver of the vehicle to position the contact apparatus below a charging contact unit because it or its position is in the driver's line of sight.

Furthermore, the contact elements can be arranged on the contact element support relative to the charging contact elements in such a manner that a defined order is maintained when forming contact pairs when the contact devices and the charging contact unit are joined. Accordingly, a first contact pair can be formed prior to another contact pair. It may in particular be envisaged that the contact elements are arranged on the contact element support in such a manner that there is an inevitable order to the formation of the contact pairs. In the apparatuses known from the state of the art, contact pairs may be formed in a delayed manner as well, but the delay is unintentional or cannot be ascribed to the arrangement of the contact elements on the contact element support. The arrangement of the contact elements on the contact element support thus ensures that the order of formation of the contact pairs is always inevitably maintained when the contact device and the charging contact unit are joined and that it cannot be easily changed, either, owing to the geometrical arrangement of the contact elements. The arrangement of the contact elements can thus define the order of formation of the contact pairs. In this way, it can in particular also be ensured that no unintentional or wrong contact or formation of contact pairs occurs between contact elements and charging contact elements that do not belong together. It is conceivable then, for example, to first test a contact pair formed first by means of measurement technology, if needed, before another contact pair is formed or electrical energy is fed through the contact pairs. Alternatively, the first contact pair can also serve to be connected to a neutral conductor or to a similar conductor ensuring electrical connection safety. The defined contact order formed in this manner allows making a process of contact formation between the contact apparatus and a charging contact unit substantially safer.

The contact element support can form two, preferably three or more positioning surfaces, which are designed to match contact surfaces of the charging contact unit for coming into contact with the contact element support. The positioning surfaces of the contact element support can then come to fit closely to the contact surfaces of the charging contact unit so that the contact element support can be accurately positioned into its designated position in the charging contact unit when the contact device and the charging contact unit are joined. The positioning surfaces may in particular have a geometry or relative arrangement to one another that matches the contact surfaces in such a manner that a secure joining of the contact device and the charging contact unit into a defined contact position is ensured.

It is particularly advantageous if the contact element support is arranged on the transverse guide in a freely displaceable manner. This freely displaceable arrangement of the contact element support significantly simplifies compensation in case of tilting of the vehicle transversely to the direction of travel due to one-sided lowering. In case of tilting, the positioning device is inclined laterally, i.e. transversely to the direction of travel, the contact element support staying connected to the charging contact unit and being displaced on the transverse guide. The transverse guide may be designed in such a manner that it is formed as a guide rail or comprises guide profiles for the contact element support. Furthermore, it may be envisaged to center the contact element support on the transverse guide, i.e. to align it centrally relative to the transverse guide in the rest position by means of a spring device, for example.

The contact elements can be bolt-shaped, wherein the contact elements can be elastically mounted on the contact element support. In this way, the contact elements are particularly simple to produce, wherein the elastic mounting can be implemented by means of a simple pressure spring within one contact element. Consequently, a punctual contact with a charging contact element can be formed under spring pre-tension. Furthermore, it may also be envisaged that a plurality of contact elements is provided for a power contact pair, for example. This is particularly expedient if the charging contact elements have a relatively large surface so that a larger current can be safely transmitted via the bolt-shaped contact elements. Preferably, two contact elements may be provided for each phase or for each power contact. In deviation from the previously described embodiment, it may also be envisaged to not realize the contact elements on the contact element support in a bolt shape, but to equip the charging contact unit with bolt-shaped charging contact elements and vice-versa.

A formation of contact pairs at time intervals can be realized in a particularly simple manner by means of at least two contact elements that protrude at different heights relative to a surface or to positioning surfaces of the contact element support. The different heights of the respective contact elements relative to the surface or to the positioning surfaces inevitably lead to a contact order in which the contact element protruding highest is the first to make contact with a charging contact element. Independently thereof, it is possible to arrange each contact element on a different positioning surface of the contact element support, wherein the positioning surfaces can then be realized relative to one another in such a manner that the relative arrangement of the positioning surfaces with the contact elements alone results in a contact order different from one another without the contact elements necessarily needing to have different heights relative to the positioning surfaces.

Also, at least one contact element can be locked to one charging contact element. The locking may take place by a form-fitting and/or force-fitting connection of the respective elements, the locking precluding movement of the contact element relative to the charging contact element and vice-versa. Thus, an unintentional movement of the vehicle cannot lead to a separation of the contact pairs or of the connection between the contact element and the charging contact element, either. Locking of the elements can be advantageously used in particular to produce a secure data connection between the vehicle and the stationary charging station. For example, it may then also be envisaged to realize the contact apparatus with five contact pairs or contact poles.

The charging contact unit according to the invention for a rapid-charging system for electrically driven vehicles, in particular electric buses or the like, serves to form an electrically conductive connection between a vehicle comprising a contact apparatus and a stationary charging station comprising the charging contact unit, wherein the contact apparatus is arranged on a vehicle, wherein the contact apparatus comprises a contact device, wherein the contact device can make contact with the charging contact unit, wherein the contact apparatus or the charging contact unit comprises a positioning device, wherein the contact device can be positioned relative to the charging contact unit by means of the positioning device, wherein the positioning device has a pantograph or a swing arm, by means of which the contact device can be positioned in the vertical direction relative to the charging contact unit, wherein the contact device has a contact element support comprising contact elements, wherein the contact elements can make contact with charging contact elements of the charging contact unit so as to form contact pairs, wherein the charging contact unit has a transverse guide, by means of which the charging contact unit can be positioned transversely relative to the contact element support.

The charging contact unit is realized in such a manner that it can be connected to the contact apparatus to form an electrically conductive connection. With regard to the advantageous effects of the charging contact unit according to the invention, reference is made to the description of advantages of the contact apparatus according to the invention.

It is particularly advantageous if the charging contact unit is arranged on the transverse guide in a freely displaceable manner. This freely displaceable arrangement of the charging contact unit significantly simplifies compensation in case of tilting of the vehicle transversely to the direction of travel due to one-sided lowering. In case of tilting, the positioning device is inclined laterally, i.e. transversely to the direction of travel, the contact element support staying connected to the charging contact unit and the charging contact unit being displaced on the transverse guide. The transverse guide may be designed in such a manner that it is formed as a guide rail or comprises guide profiles for the charging contact unit. Furthermore, it may be envisaged to center the charging contact unit on the transverse guide, i.e. to align it centrally relative to the transverse guide in the rest position by means of a spring device, for example. In principle, it is also possible that the charging contact unit comprises the positioning device and is moved toward the contact device by means of the positioning device.

The charging contact unit can form a receiving opening for the contact device, wherein the contact device can be inserted into the receiving opening of the charging contact unit. The receiving opening can preferably be V-shaped. In case the contact element support shifts relative to the receiving opening when the contact device and the charging contact unit are being joined, the V-shape of the receiving opening causes the contact element support to be centered.

In this way, the receiving opening can form a guide for the contact device when the contact device and the charging contact unit are joined. Potential positional deviations of the vehicle stopping at a stopping place from a designated stopping position can thus be easily compensated in that the contact element support is guided into a contact position at the charging contact unit by the receiving opening.

The charging contact unit can be composed of a charging contact element support and of the charging contact elements, wherein the charging contact element support can be made of a plastic material. In this case, production of the charging contact unit is particularly cost effective and simple. For instance, the charging contact element support can also be made of plastic in one piece. In this case, the charging contact elements can be inserted into the charging contact element support or into designated mounts or recesses.

Furthermore, the charging contact unit can be realized as a roof-shaped longitudinal rail that can be arranged in a direction of travel of the vehicle. In this case, the charging contact elements can be arranged on an underside of the roof-shaped longitudinal rail so that the charging contact elements are not directly exposed to the effects of the weather. Also, the roof-shaped longitudinal rail can have a relatively long shape, making an exact positioning of the vehicle at a stopping place unnecessary. Also, the roof-shaped longitudinal rail can preferably be open at its ends so that the contact element support can also be inserted into and pulled out of the roof-shaped longitudinal rail in the direction of travel.

The charging contact elements can be advantageously realized as a conductor strip. In this way, the charging contact elements can form a relatively large contactable surface for the contact elements. Also, a conductor strip is simple to produce, such as by using a semi-finished product as the conductor strip. Vice-versa, it is also possible to realize the contact elements on the contact element support as conductor strips and to realize the charging contact elements in a bolt shape or as bolts according to a previously described embodiment of the contact element support comprising contact elements.

The rapid-charging system according to the invention comprises a contact apparatus according to any one of claims 1 to 7 and/or a charging contact unit according to any one of claims 8 to 14. Furthermore, the rapid-charging system can also comprise a charging station. In particular, it is not necessarily required that a transverse guide is present at the charging contact unit and a transverse guide is present on the contact element support, respectively. For instance, it is sufficient that a transverse guide is provided at the charging contact unit or at the contact element support. The substantial aspect is that a relative movement of the charging contact element support toward the pantograph or to the swing arm and/or of the charging contact unit to its direct suspension above a driving lane is made possible transverse to the direction of travel.

Furthermore, it is not necessarily required that the arrangement of the contact elements on the contact element support and the arrangement of the charging contact elements on the charging contact unit are each on their own the cause for a defined contact order. For instance, the arrangement of the contact elements and the arrangement of the charging contact elements can cause the corresponding contact order, in which case, however, an interaction between the contact apparatus and the charging contact unit or between the contact elements and the charging contact elements must be tuned with regard to their arrangement in such a manner that the appropriate contact order is achieved.

In the method according to the invention for forming an electrically conductive connection between a vehicle and a stationary charging station, in particular for a rapid-charging system for electrically driven vehicles, such as electric buses or the like, comprising a contact apparatus and a charging contact unit, the contact apparatus is arranged on a vehicle, wherein the charging contact apparatus comprises a contact device or the charging contact unit, wherein the contact device is brought into contact with the charging contact unit of the charging station, wherein the contact apparatus comprises a positioning device, wherein the contact device is positioned relative to the charging contact unit by means of the positioning device, wherein the positioning device has a pantograph or a swing arm, by means of which the contact device is positioned in the vertical direction relative to the charging contact unit, wherein the contact device has a contact element support comprising contact elements, wherein the contact elements are brought into contact with charging contact elements of the charging contact unit so as to form contact pairs, wherein the contact device and the charging contact unit are joined, wherein the positioning device has a transverse guide, by means of which the contact element support is positioned transversely to the charging contact unit during joining. Preferably, the positioning unit and/or the charging contact unit has the transverse guide. With respect to the advantageous effects of the method according to the invention, reference is made to the description of advantages of the contact apparatus and of the charging contact unit according to the invention.

In the method, first, a first contact pair can be formed between a first contact element and a first charging contact element before another contact pair is formed between another contact element and another charging contact element. Apart from that, it may also be envisaged that contact pairs are separated, i.e. interrupted, in the reverse contact order when separating the contact apparatus from the charging contact unit.

Advantageously, first, a protective conductor contact pair can be formed prior to a power contact pair. In this way, it is ensured that potential incorrect contact formations of power contacts cannot lead to potential damage or danger to people.

Furthermore, first, a power contact pair can be formed prior to a control conductor contact pair. After secure formation of the control conductor contact pair, a rapid-charging process can be activated. In this way, even safer contact formation and rapid charging is made possible because electrical energy is conducted via the power contact pairs only when the control conductor contact pair has been formed and allows the rapid-charging process to be controlled and monitored. In this way, a potential spark-over or the like can be avoided when forming the power contact pairs.

Other advantageous embodiments of the method become apparent from the dependent claims, which refer back to independent claims 1 and 8.

In the following description, a preferred embodiment of the invention will be described in more detail with reference to the accompanying drawing.

In the drawing:

FIG. 7 shows a front view of the contact element support;

FIG. 8 shows a lateral view of the contact element support;

FIG. 9 shows a top view of the contact element support;

FIG. 19 shows the mounting device in a bottom view;

FIG. 20 shows the mounting device in a front view.

Figure 1:
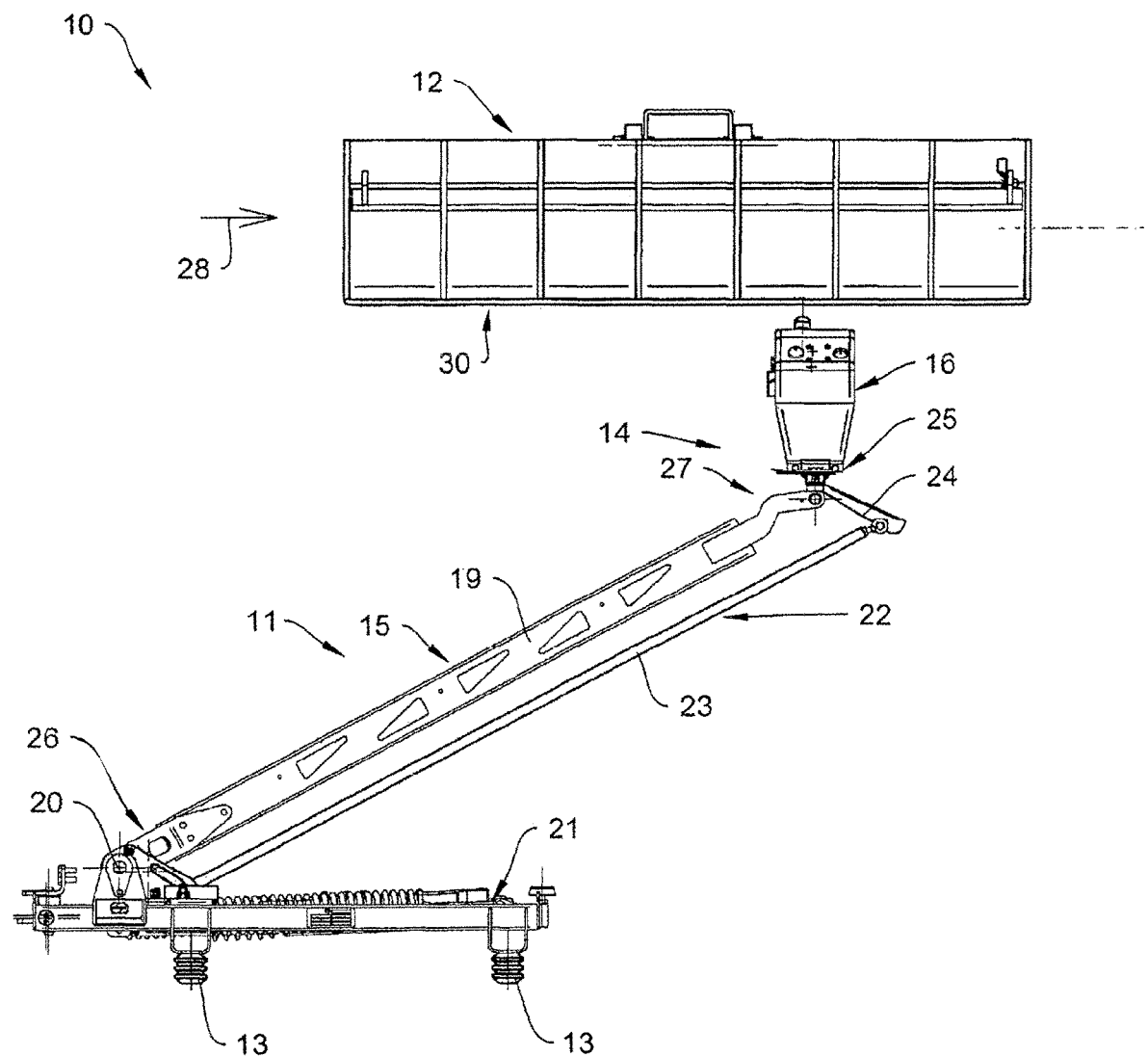
FIG. 1 shows an embodiment of a rapid-charging system in a lateral view.
Figure 2:
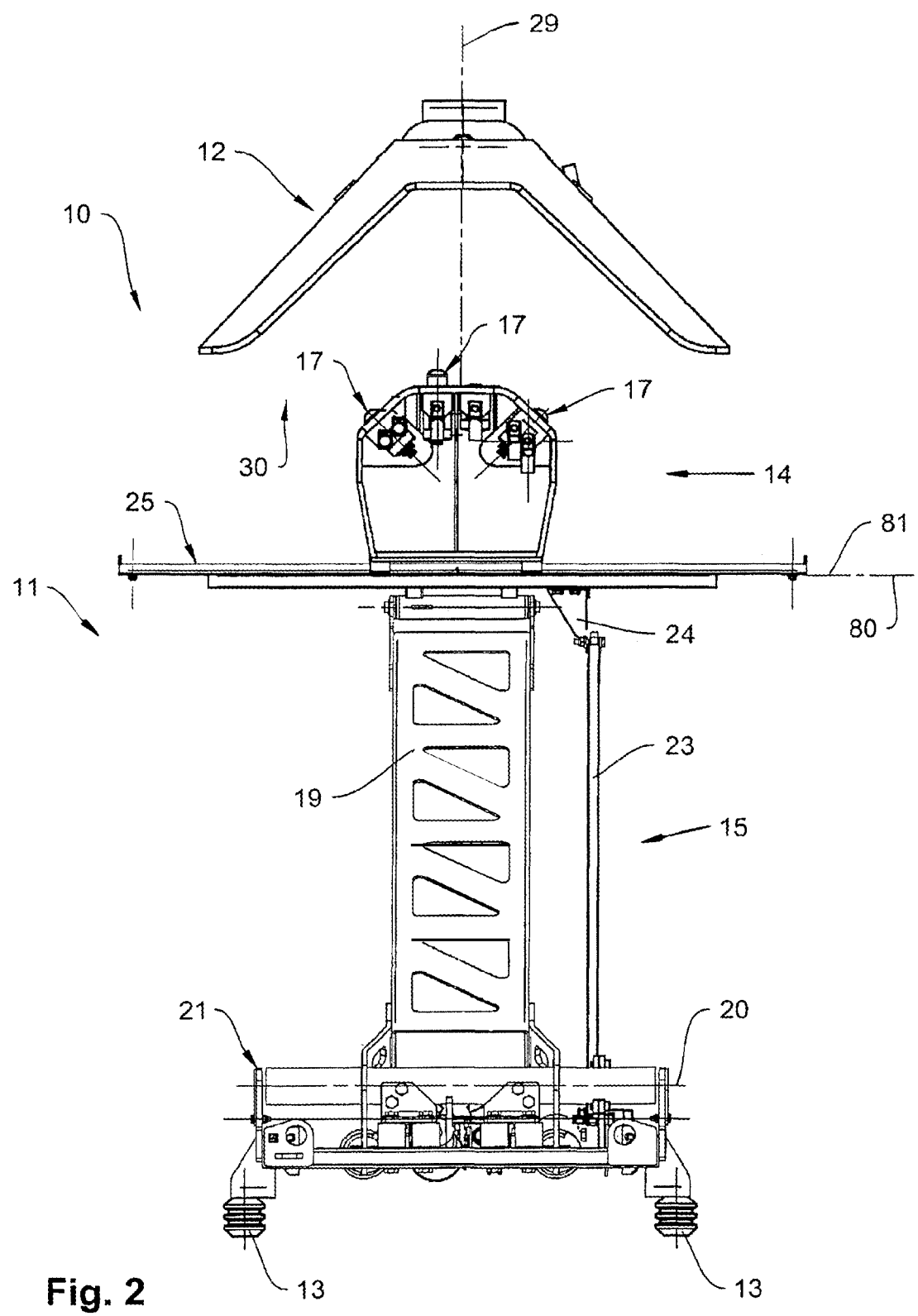
FIG. 2 shows the rapid-charging system in a front view.

A combined view of FIGS. 1 and 2 shows a rapid-charging system 10 composed of a contact apparatus 11 and a charging contact unit 12. A mounting device is not illustrated in this case for reasons of simplicity, but it can be present. The contact apparatus 11 is fixed on a roof of a vehicle or electric bus (not illustrated) via electrically insulated legs 13. The charging contact unit 12 is suspended above the electric bus in the area of a stopping place of the electric bus by means of a suspension device (not illustrated). The contact apparatus 11 comprises a contact device 14, which can make contact with the charging contact unit 12, and a positioning device 15, by means of which the contact device 14 can be positioned relative to the charging contact unit 12. The contact device 14 further comprises a contact element support 16 comprising contact elements 17, which can make contact with charging contact elements 18 of the charging contact unit 12. In the embodiment shown, the positioning device 15 has a swing arm 19, which can be pivoted via a pivot bearing 20 on an attachment frame 21 of the contact apparatus 11. Furthermore, a linkage 22 of the positioning device 15 is provided, in which a rod 23 of the linkage 22 is connected to a lever 24 of a transverse guide 25 of the positioning device 15. When the swing arm 19 is pivoted about the pivot bearing 20 at a lower end 26 of the swing arm 19, the transverse guide 25, which is arranged at an upper end 27 of the swing arm 19, is always kept in a horizontal position via the linkage 22. Accordingly, the contact element support 16 cannot tilt relative to a horizontal plane 80 during pivoting. The contact element support 16 is arranged on the transverse guide 25 in a freely displaceable manner transversely to a direction of travel, which is indicated by an arrow 28. In this way, it can be ensured that the contact element support 16 can freely align itself relative to a vertical axis 29 of the charging contact unit 12 when the contact element support 16 and the charging contact unit 12 are joined if the contact element support 16 has not been positioned directly flush with the vertical axis 29 during a stop of the electric bus. Even after contact has been made with the charging contact unit 12 by positioning the contact element support 16 in a receiving opening 30 of the charging contact unit 12, the electric bus can be tilted relative to the vertical axis 29 by one-sided lowering, if needed, wherein the contact element support 16 can then be freely displaced on the transverse guide 25 transversely to the direction of travel of the electric bus. In particular, the swing arm 19 is tilted by an angle (not illustrated) relative to the vertical axis 29 during lowering.

Figure 3:
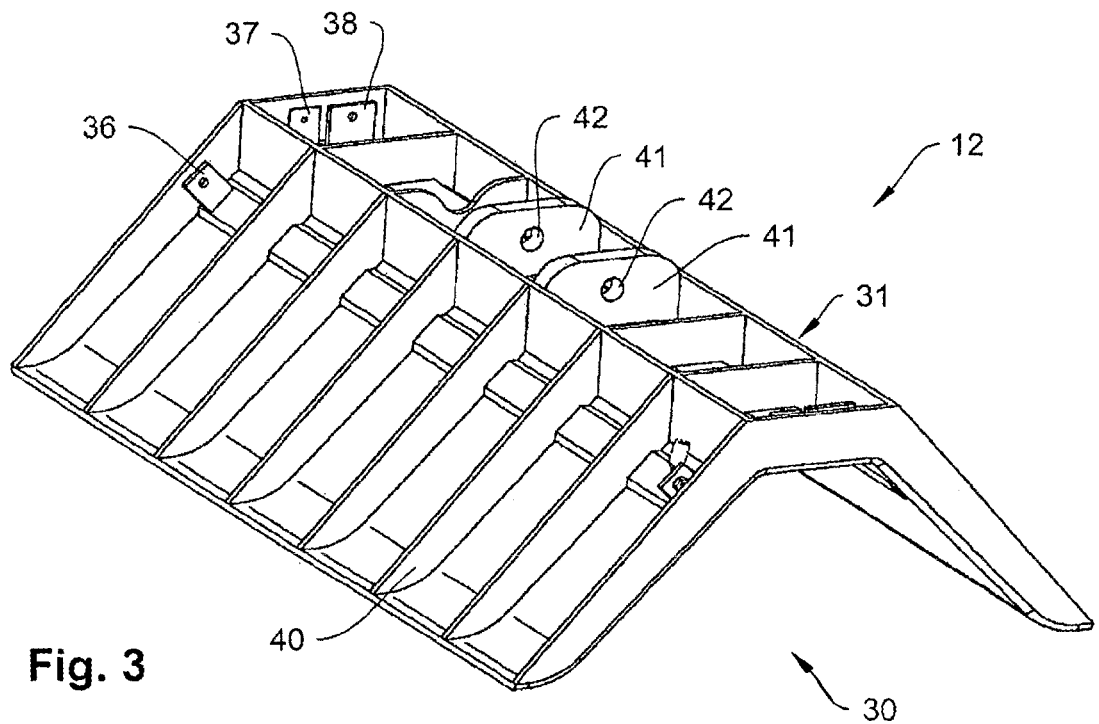
FIG. 3 shows a charging contact unit of the rapid-charging system in a perspective view.
Figure 4:
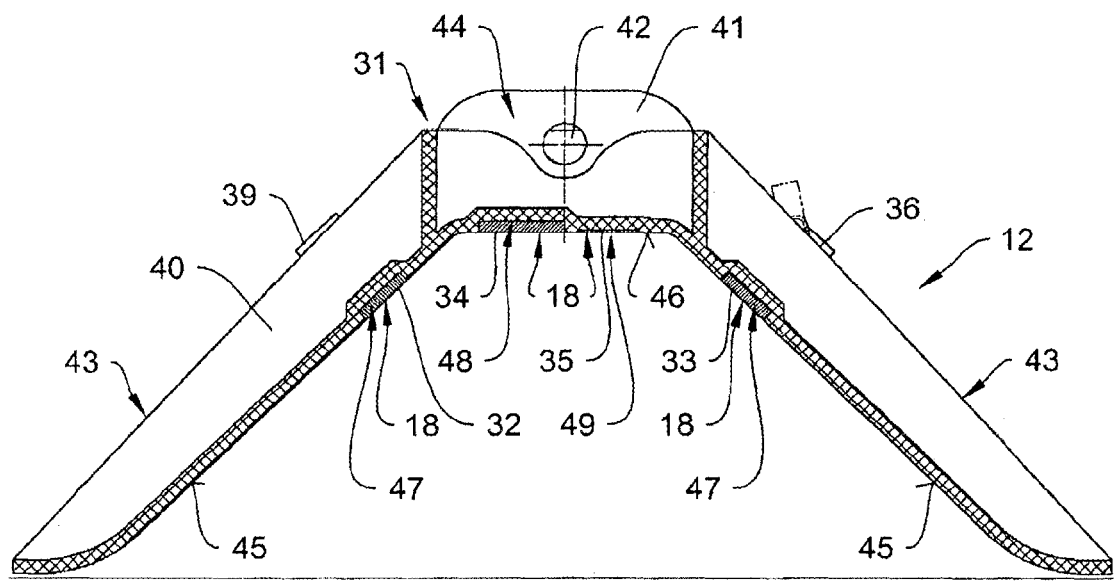
FIG. 4 shows the charging contact unit in a cross-sectional view.
Figure 5:
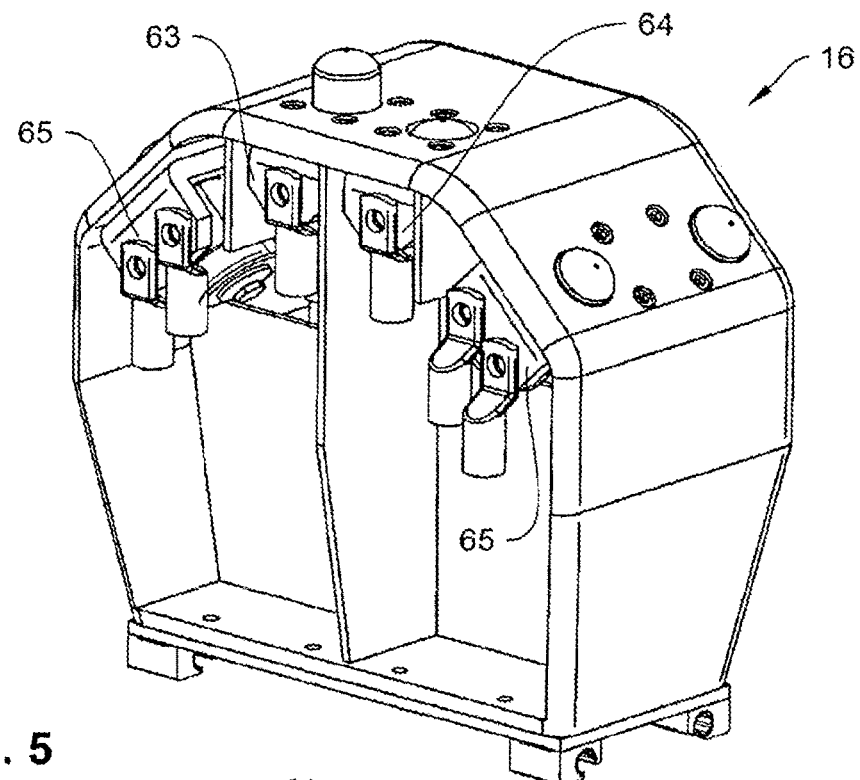
FIG. 5 shows a contact element support of a contact apparatus of the rapid-charging system in a perspective view.
Figure 6:
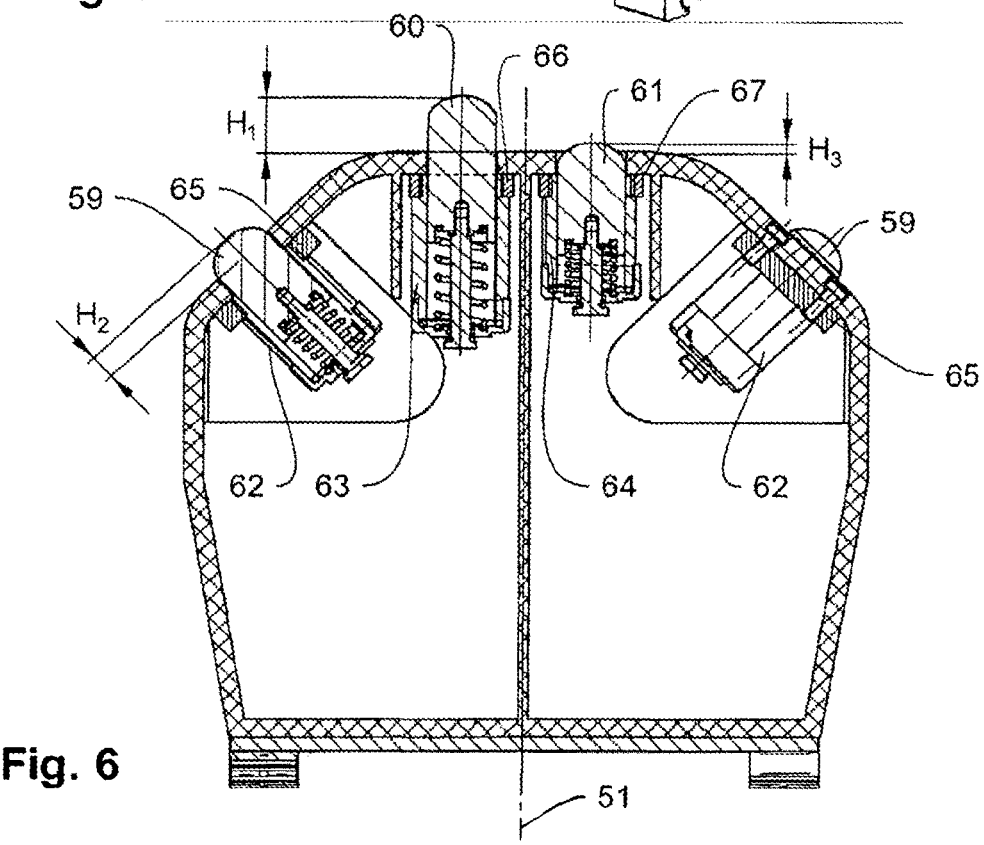
FIG. 6 shows a sectional view of the contact element support along a line VI-VI of FIG. 9.

A combined view of FIGS. 3 and 4 shows the charging contact unit 12, which is substantially composed of a charging contact element support 31, which is made of a plastic material, and of the charging contact element 18. The charging contact elements 18 themselves are realized as conductor strips 32, 33, 34 and 35 and extend in the longitudinal direction of the charging contact element support 31. Conductor strips 32 and 33 serve to transmit a charging current, conductor strip 34 representing a protective conductor and conductor strip 35 representing a control line. Apart from that, contact tabs 36 to 39 for connection to cables (not illustrated) are provided. The charging contact element support 31 is substantially formed in one piece and has, among other things, reinforcement ribs 40 and attachment ribs 41 having passage openings 42 for suspending the charging contact element support 31 from a pole (not illustrated) or the like. The receiving opening 30 is V-shaped in such a manner that two symmetrical sides 43 are connected to each other via a horizontal bridge 44. The attachment ribs 41 form the bridge 44, among other things, and the reinforcement ribs 40 form the sides 43. Within the receiving opening 30, the charging contact unit 12 forms contact surfaces 45 and 46 for the contact element support 16. Within each of the contact surfaces 45 on the sides 43, recesses 47 are formed for receiving conductor strips 32 and 33, respectively, in a flush manner, recesses 48 and 49 for receiving conductor strips 34 and 35, respectively, in a flush manner being formed within the contact surface 46 of the bridge 44.

A combined view of FIGS. 5 to 9 shows the contact element support 16 in different views. The contact element support is formed V-shaped at an upper end 50 relative with respect to a vertical axis 51 so as to match the receiving opening 30 of the charging contact unit 12. Two positioning surfaces 52 are formed in an inclined manner relative to a horizontal plane 53 and are connected to each other via a horizontal positioning surface 54. Consequently, positioning surfaces 52 can come into contact with contact surfaces 45 and positioning surface 54 can come into contact with contact surface 46. Two contact elements 17 are arranged within each positioning surface 52, which are realized as power contact elements 55 and 56, respectively. In positioning surface 54, two contact elements 17 are arranged, which are realized as a protective conductor contact element 57 and as a control conductor contact element 58. The power contact elements 55 and 56 have electrically conductive bolts 59, the protective conductor contact element 57 has one bolt 60 and the control conductor contact element 58 has one bolt 61. The bolts 59 to 61 are elastically mounted in sleeves 62, 63 and 64, respectively, in a longitudinally mobile manner. In particular bolt 60 protrudes beyond positioning surface 54 at a height $H_1$, bolts 59 protruding beyond positioning surface 52 at a height $H_2$ and bolt 61 protruding beyond positioning surface 54 at a height $H_3$. Height $H_1$ is greater than height $H_2$, and height $H_2$ is greater than height $H_3$. Due to the different heights $H_1$ to $H_3$, a defined contact order of the bolts 59 to 61 with the conductor strips 32 to 35 is inevitably achieved when the contact apparatus 11 and the charging contact 12 are joined or when the contact device 14 is inserted into the receiving opening 30, a first contact pair being formed first between bolt 60 and conductor strip 34, then four second contact pairs being formed with conductor strips 32 and 33 via bolts 59 and finally a third contact pair being formed with bolt 61 and conductor strip 35. When the swing arm 19 is lowered, said contact pairs are separated in the reverse order. Apart from that, the contact device has contact tabs 65, 66 and 67 for connecting lines (not illustrated). Contact tab 65 is connected to sleeve 62, contact tab 66 is connected to sleeve 63 and contact tab 67 is connected to sleeve 64 in an electrically conductive manner. At a lower end 68 of the contact device 14, a bottom plate 69 having sliding legs 70 is arranged. Each of the sliding legs 70 forms a support opening 71 having a sliding surface 72. Via the sliding legs 70, the contact device 14 is connected to the transverse guide 25.

Figure 10:
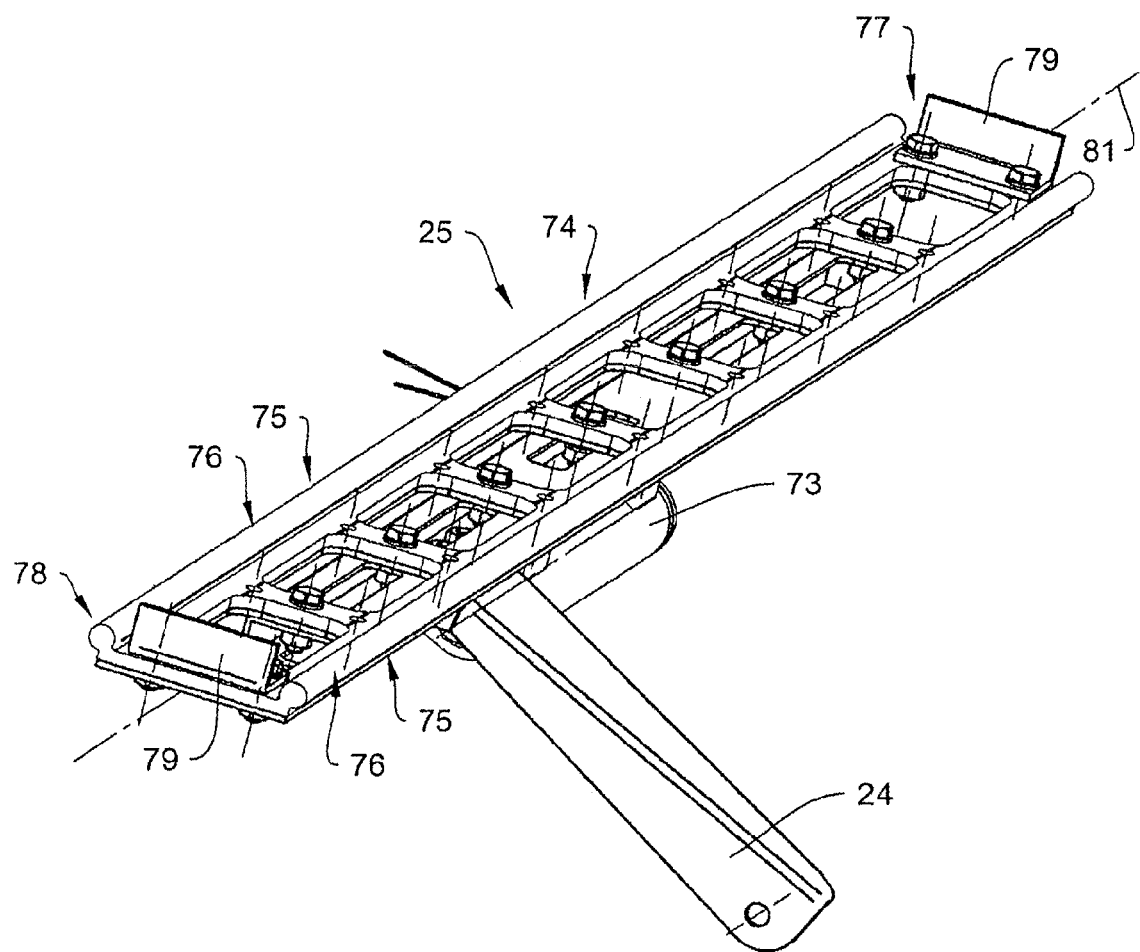
FIG. 10 shows a transverse guide of the contact apparatus of the rapid-charging system in a perspective view.

FIG. 10 shows a perspective view of the transverse guide 25 comprising the lever 24 of the linkage 22. Furthermore, a hub 73 for rotatable connection of the transverse guide 25 to the swing arm 19 is provided. The transverse guide 25 is substantially formed by a longitudinal profile 74 that forms guide tracks 76 for the sliding legs 70 along longitudinal edges 75. The guide tracks 76 have a substantially round cross-section, which is formed to match the support opening 71 of the sliding legs 70. A three-quarter circular shape of the support opening 71 can thus ensure that the sliding legs 70 are connected to the guide track 76 in a form-fitting manner and can be displaced along the guide track 76. At each end 77 and 78 of the longitudinal profile 74, stops 79 are attached, which prevent the contact device 14 from being pushed off of the transverse guide 25. The contact device 14 is thus freely displaceable along the entire length of the transverse guide 25 and of the longitudinal profile 74. In particular, if the longitudinal axis 81 of the transverse guide 25 is pivoted about an angle relative to a horizontal plane 80 by one-sided lowering of an electric bus, the longitudinal profile 74, too, is displaced along the longitudinal axis 81 so that the displacement can be compensated by displacing the contact device by the same amount along the guide track 76.

Figure 11:
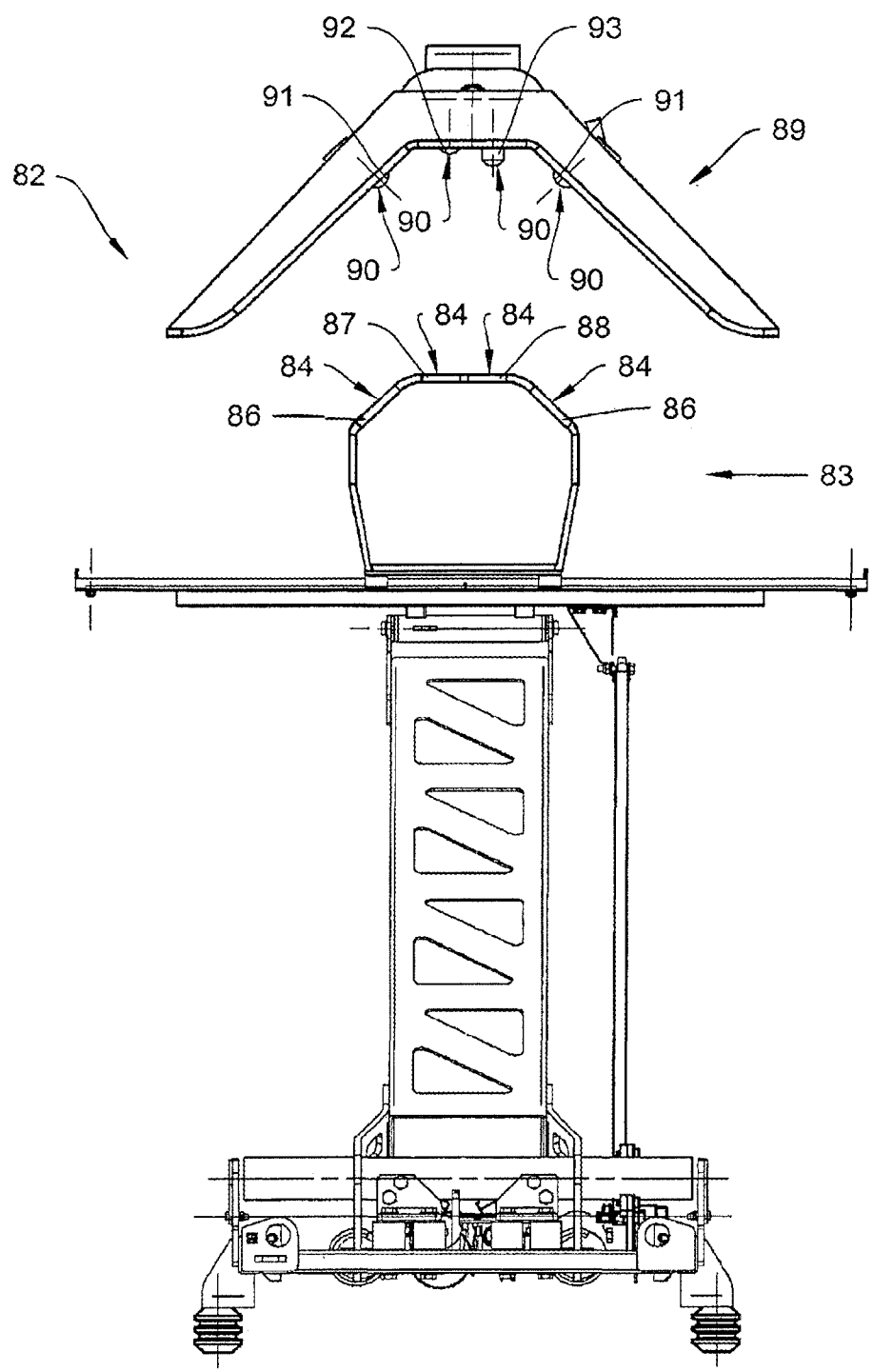
FIG. 11 shows a second embodiment of a rapid-charging system in a front view.

FIG. 11 shows another embodiment of a rapid-charging system 82, which is different from the rapid-charging system described in FIGS. 1 to 10 in that it has a contact device 83 that is quipped with contact elements 84 that are realized as conductor strips 85, 86, 87 and 88. A charging contact unit 89 has charging contact elements 90 that are realized as bolts 91, 92 and 93. A contact can be formed in the same way as described above.

Figure 12:
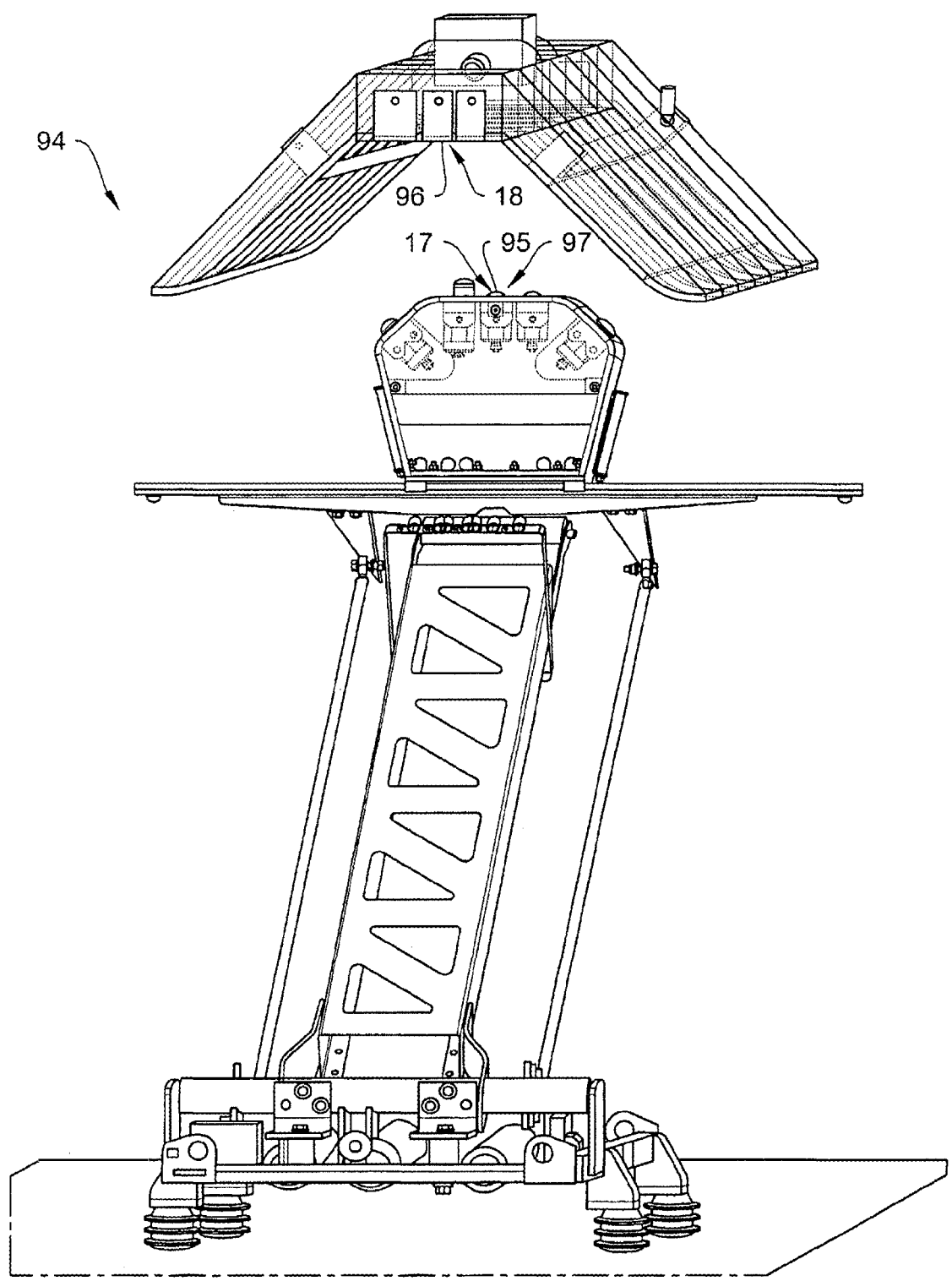
FIG. 12 shows a third embodiment of a rapid-charging system in a perspective view.
Figure 13:
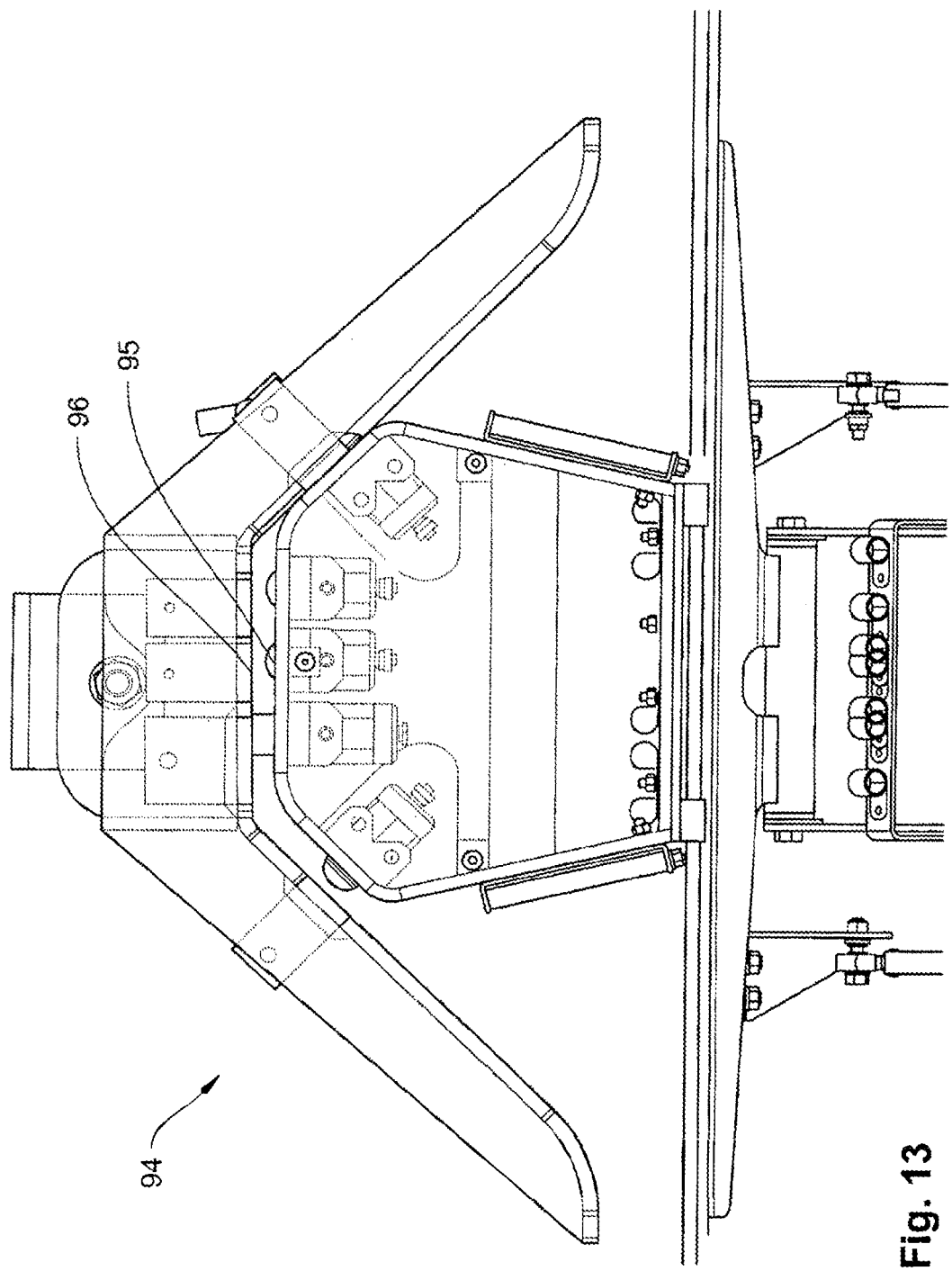
FIG. 13 shows a third embodiment of the rapid-charging system in a front view.

FIGS. 12 and 13 show a third embodiment of a rapid-charging system 94, which is different from the rapid-charging system described in FIGS. 1 to 10 in that it has a bolt 95 as another contact element 17 and a conductor strip 96 as another charging contact element 18. The Bolt 95 forms a locking contact element 97. By way of the locking contact element 97, a secure data connection with a stationary charging station can in particular be produced.

Figures 14, 15:
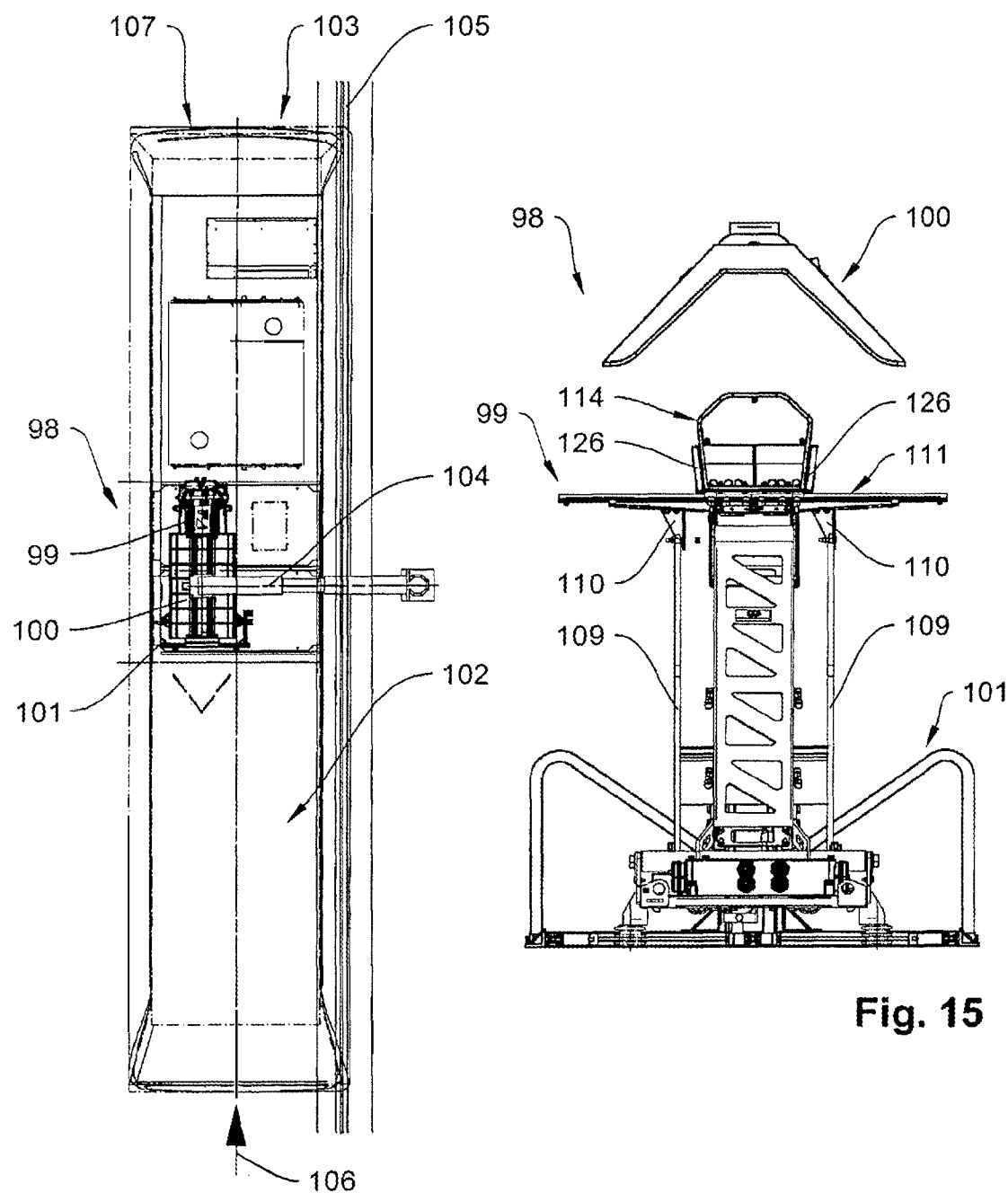
FIG. 14 shows a fourth embodiment of the rapid-charging system in a top view.
FIG. 15 shows the fourth embodiment of the rapid-charging system in a front view.
Figure 16:
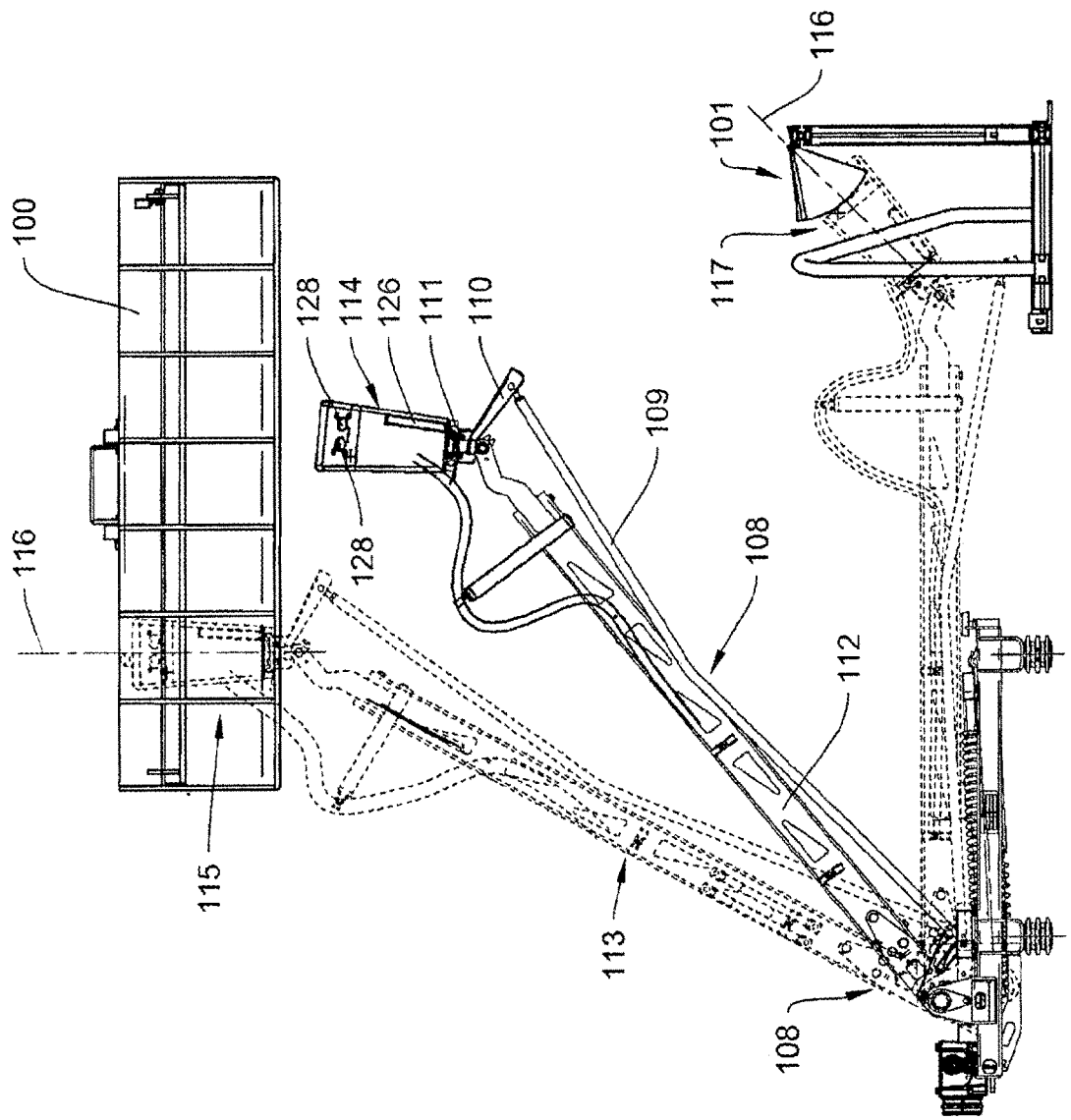
FIG. 16 shows the fourth embodiment of the rapid-charging system in a lateral view.
Figure 17:
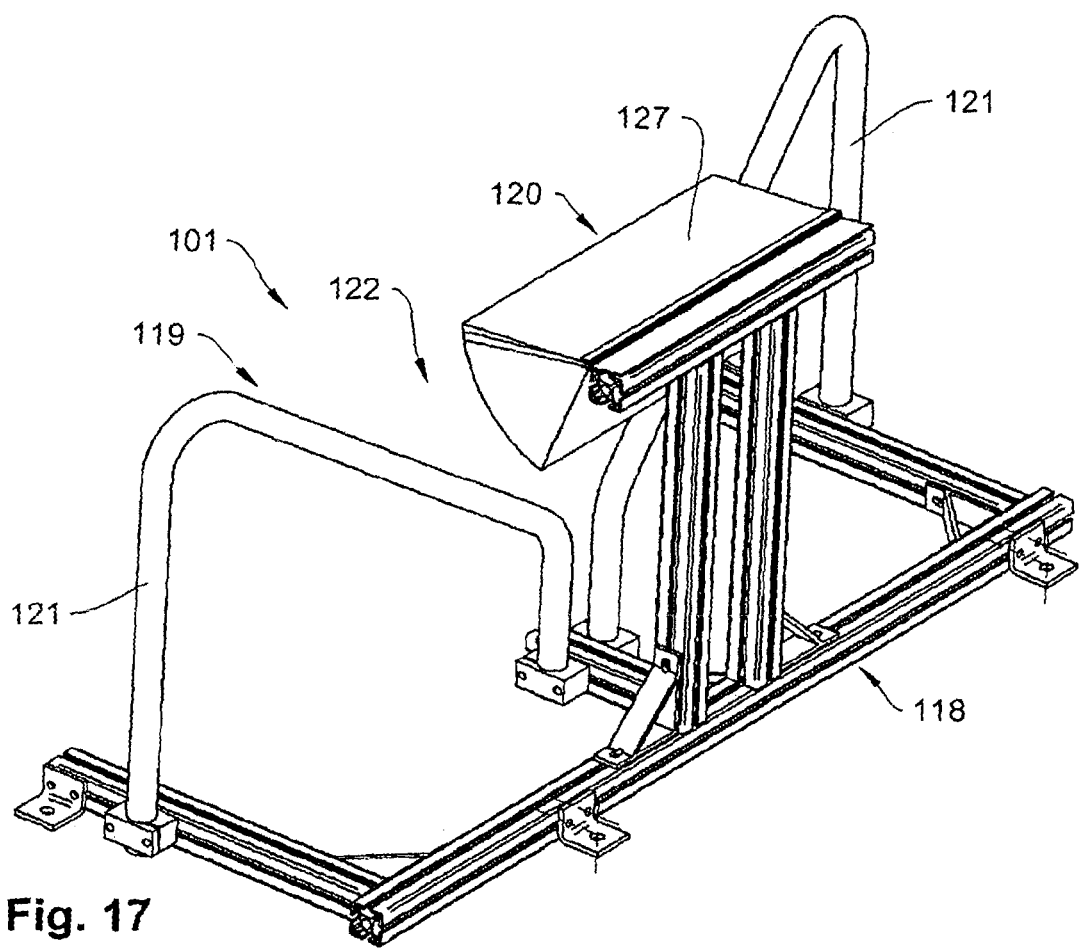
FIG. 17 shows a mounting device in a perspective view.
Figure 18:
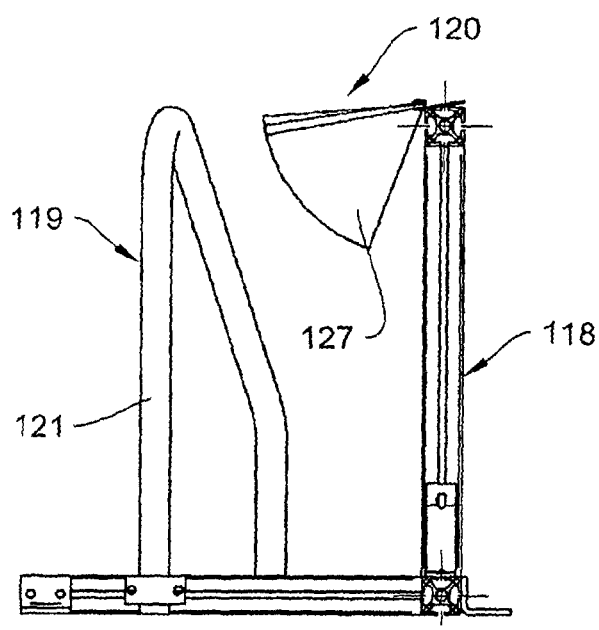
FIG. 18 shows the mounting device in a lateral view.

A combined view of FIGS. 14 to 16 shows a fourth embodiment of a rapid-charging system 98 comprising a contact device 99 and a charging contact unit 100 in different views. Furthermore, the rapid-charging system 98 comprises a mounting device 101, which is illustrated in more detail in FIGS. 17 to 20. As shown in FIG. 14, the contact apparatus 99 is arranged on a roof 102 of a vehicle 103 together with the mounting device 101. The charging contact unit 100 is supported on a pole 104 and positioned above the contact apparatus 99. The vehicle 103 is parked at a curb 105, that is parked parallel thereto, a direction of travel of the vehicle 103 being indicated by an arrow 106. The contact apparatus 99 and the mounting device 101 are arranged on a left-side half 107 of the vehicle 103 relative to the direction of travel, where a steering device (not illustrated) for the vehicle 103 is located.

In principle, the rapid-charging system 98 is realized similarly to the rapid-charging system described in FIGS. 1 to 10. In contrast to that rapid-charging system, a linkage 108 comprising two rods 109 is provided in this case. Each of the rods 109 is rotatably connected to levers 110, the levers 110 being permanently connected to a transverse guide 111, which is arranged in a pivotable manner on a swing arm 112 of a positioning device 113. A contact device 114 is arranged on the transverse guide 111 in a freely displaceable manner transversely to the direction of travel of the vehicle 103, a vertical axis 116 of the contact device 114 being vertically positioned in an upper contact position 115, and the vertical axis 116 of the contact device 114 being positioned in a lower mounting position 117 in an inclined manner relative to the roof 102 of the vehicle 103. The swing arm 112 is substantially horizontally oriented.

The mounting device 101 is substantially composed of a base frame 118 for mounting the mounting device 101 on a roof 102 of the vehicle 103 and of a guiding device 119 and a cleaning device 120. The guiding device 119 is made of two curved tube profiles 121, which are curved and arranged in such a manner that a V-shaped receiving opening 122 for the contact device 114 is formed. Furthermore, a linear guide 123 is formed in a vertical direction in the mounting position 117. In particular tube sections 124 of the tube profiles 121 form a guide track 125 for rollers 126 that are arranged on the contact device 114, allowing the rollers 126 to roll on and slide along the guide tracks 125. When being lowered into the mounting position 117, the contact device 114 is centered in the middle of the guiding device 119 in such a manner that the contact device 114 is also centered on the transverse guide 111. When a charging contact unit (not illustrated) is approached, the contact device 114 is then aligned on the transverse guide 111 in such a manner again that the contact device 114 can be introduced into the corresponding charging contact unit.

The cleaning device 120 is substantially composed of a brush 127, which is arranged on the base frame 118 in such a manner that contact elements 128 come into contact with the brush 127 in the mounting position 117 and are cleaned by the brush 127 each time they are moved into the mounting position 117 and out of the mounting position 117.

The invention claimed is:

1. A rapid-charging system for electrically driven vehicles, comprising a contact apparatus and a charging contact unit, wherein the contact apparatus serves to form an electrically conductive connection between a vehicle and a stationary charging station having said charging contact unit, wherein said contact apparatus can be arranged on a roof a vehicle, wherein said contact apparatus comprising:
   a contact device contactable with the charging contact unit,
   a positioning device positioning the contact device relative to the charging contact unit, wherein the positioning device has a pantograph or a swing arm positioning the contact device in the vertical direction relative to the charging contact unit, and
   a contact element support having contact elements, wherein the contact elements contact charging contact elements of the charging contact unit so as to form contact pairs, the positioning device having a transverse guide positioning the contact element support transversely relative to the charging contact unit, wherein the transverse guide is arranged at a distal end of the pantograph or of the swing arm, wherein an additional linkage is provided, which stabilizes the contact device relative to the charging contact unit and aligns it in the vertical direction.

2. The rapid-charging system according to claim 1, in which the contact elements are arranged on the contact element support relative to the charging contact elements in such a manner that a defined order is maintained when forming contact pairs when the contact device and the charging contact unit are joined.

3. The rapid-charging system claim 1, in which the contact element support forms at least two positioning surfaces that match contact surfaces of the charging contact unit for coming into contact with the contact element support.

4. The rapid-charging system claim 1, in which the contact element support is arranged on the transverse guide in a freely displaceable manner.

5. The rapid-charging system according to claim 1, in which the contact elements are bolt-shaped and elastically mounted on the contact element support.

6. The rapid-charging system according to claim 1, in which at least two contact elements protrude at different heights relative to a surface of the contact element support.

7. The rapid-charging system according to claim 1, in which the charging contact unit is arranged on the transverse guide in a freely displaceable manner.

8. The rapid-charging system according to claim 1, in which the charging contact unit forms a receiving opening for the contact device, wherein the contact device can be inserted into the receiving opening of the charging contact unit.

9. The rapid-charging system according to claim 8, in which the receiving opening forms a guide for the contact device when the contact device and the charging contact unit are joined.

10. The rapid-charging system according to claim 1, in which the charging contact unit is composed of a charging contact element support and of the charging contact elements, wherein the charging contact element support is made of a plastic material.

11. The rapid-charging system according to claim 1, in which the charging contact unit is a roof-shaped longitudinal rail, which can be arranged in a direction of travel of the vehicle.

12. The rapid-charging system according to claim 1, in which the charging contact elements are conductor strips.

13. A method for forming an electrically conductive connection between a vehicle and a stationary charging station for electrically driven vehicles comprising a contact apparatus and a charging contact unit, wherein the contact apparatus is arranged on a vehicle, wherein the contact apparatus comprises a contact device, said method comprising:

bringing contact device into contact with a charging contact device of the charging station, positioning the contact device relative to the charging contact unit using a positioning device having a pantograph or a swing arm positioning the contact device in the vertical direction relative to the charging contact unit bringing contact elements of a contact element support into contact with charging contact elements of the charging contact unit so as to form contact pairs; and positioning the contact element support transversely relative to the charging contact unit during joining of the contact device and the charging contact unit when bringing the contact elements of the contact element support into contact with the charging contact elements, wherein an additional linkage is provided, which stabilizes the contact device relative to the charging contact unit and aligns it in the vertical direction.

14. The method according to claim 13, including forming a first contact pair between a first contact element and a first charging contact element before another contact pair is formed between another contact element and another charging contact element.

* * * * *